(12) United States Patent
Kim et al.

(10) Patent No.: US 11,274,201 B2
(45) Date of Patent: Mar. 15, 2022

(54) IONIZING RADIATION-RESISTANT THERMOPLASTIC RESIN COMPOSITION, AND MOLDED PRODUCT COMPRISING SAME

(71) Applicant: LOTTE ADVANCED MATERIALS CO., LTD., Yeosu-si (KR)

(72) Inventors: Yoen Kyoung Kim, Uiwang-si (KR); Cheon Seok Yang, Uiwang-si (KR); Byeong Yeol Kim, Uiwang-si (KR); Seung Yong Bae, Uiwang-si (KR); Bong Jae Jeong, Uiwang-si (KR); Ju Sung Kim, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 420 days.

(21) Appl. No.: 16/334,053

(22) PCT Filed: May 30, 2017

(86) PCT No.: PCT/KR2017/005625
§ 371 (c)(1),
(2) Date: Mar. 18, 2019

(87) PCT Pub. No.: WO2018/062661
PCT Pub. Date: Apr. 5, 2018

(65) Prior Publication Data
US 2021/0277220 A1 Sep. 9, 2021

(30) Foreign Application Priority Data
Sep. 30, 2016 (KR) .................. 10-2016-0126594

(51) Int. Cl.
C08L 33/12 (2006.01)
C08L 51/02 (2006.01)
C08L 55/02 (2006.01)

(52) U.S. Cl.
CPC .............. C08L 33/12 (2013.01); C08L 55/02 (2013.01); *C08L 2201/08* (2013.01); *C08L 2203/02* (2013.01); *C08L 2205/025* (2013.01); *C08L 2205/035* (2013.01)

(58) Field of Classification Search
CPC .................. C08K 5/06; C08L 51/00
See application file for complete search history.

(56) References Cited

U.S. PATENT DOCUMENTS

| 5,270,387 | A | * | 12/1993 | Sheilds | ................ C08F 279/02 525/71 |
| 5,599,863 | A | | 2/1997 | Zimmerman | |
| 6,166,116 | A | | 12/2000 | Sleeckx | |
| 9,732,214 | B2 | | 8/2017 | Choi et al. | |
| 2006/0041062 | A1 | | 2/2006 | Choi et al. | |
| 2014/0322487 | A1 | | 10/2014 | Choi et al. | |
| 2015/0005425 | A1 | | 1/2015 | Ahn et al. | |
| 2016/0002455 | A1 | | 1/2016 | Chung et al. | |
| 2016/0243728 | A1 | | 8/2016 | Fischer et al. | |
| 2018/0179373 | A1 | * | 6/2018 | Kim | ................. C08K 3/22 |

FOREIGN PATENT DOCUMENTS

| CN | 1860175 A | 11/2006 |
| CN | 103958599 A | 7/2014 |
| CN | 104169361 A | 11/2014 |
| CN | 104603198 A | 5/2015 |
| DE | 11 2011 105875 T5 | 11/2011 |
| JP | 04-275356 A | 9/1992 |
| JP | 10-503793 A | 4/1998 |
| KR | 10-2012-0021786 A | 3/2012 |
| KR | 10-2013-0073002 A | 7/2013 |
| KR | 10-2014-0005510 A | 1/2014 |
| KR | 10-2016-0081497 A | 7/2016 |
| WO | 2018/062661 A1 | 4/2018 |

OTHER PUBLICATIONS

International Search Report in counterpart International Application No. PCT/KR2017/005625 dated Sep. 11, 2017, pp. 1-4.
Office Action in counterpart Japanese Application No. 2019-516163 dated Nov. 4, 2020, pp. 1-8.
Office Action in counterpart Chinese Application No. 201780059640.1 dated Nov. 10, 2020, pp. 1-5.
Search Report in counterpart European Application No. 17856547.9 dated Mar. 27, 2020, pp. 1-5.

* cited by examiner

*Primary Examiner* — Jeffrey C Mullis
(74) *Attorney, Agent, or Firm* — Additon, Pendleton & Whitespoon, P.A.

(57) ABSTRACT

A thermoplastic resin composition of the present invention comprises a rubber-modified vinyl-based graft copolymer, a first aromatic vinyl-based copolymer, a second aromatic vinyl-based copolymer, and a polyalkylene glycol, wherein the first aromatic vinyl-based copolymer is a copolymer of methyl methacrylate, methyl acrylate, an aromatic vinyl-based monomer, and a monomer copolymerizable with the aromatic vinyl-based monomer, the second aromatic vinyl-based copolymer is a copolymer of an aromatic vinyl-based monomer and a monomer copolymerizable with the aromatic vinyl-based monomer, and the weight ratio of methyl methacrylate to methyl acrylate, in the first aromatic vinyl-based copolymer, is approximately 1:0.01 to approximately 1:0.2. The thermoplastic resin composition has excellent discoloration resistance, color, transparency, and the like even after irradiation with ionizing radiation.

9 Claims, No Drawings

IONIZING RADIATION-RESISTANT THERMOPLASTIC RESIN COMPOSITION, AND MOLDED PRODUCT COMPRISING SAME

TECHNICAL FIELD

The present invention relates to an ionizing radiation resistant thermoplastic resin composition and a molded product comprising the same. More particularly, the present invention relates to an ionizing radiation resistant thermoplastic resin composition which has good properties in terms of discoloration resistance, color and transparency even after irradiation with ionizing radiation and a molded product comprising the same.

BACKGROUND ART

Medical supplies require complete sterilization. For complete sterilization, there have been proposed contact treatment using sterilization gases such as ethylene oxide, heat treatment in an autoclave, and irradiation treatment using ionizing radiation such as gamma rays, electron beams, and X-rays. Thereamong, contact treatment using ethylene oxide has a problem in that ethylene oxide is toxic and unstable and thus causes environmental problems upon disposal thereof. In addition, heat treatment in an autoclave can cause degradation of a resin during high temperature treatment and requires high energy costs and a drying process for removing residual moisture from treated components. Thus, irradiation treatment using ionizing radiation, which allows treatment at low temperature and is relatively economical, is generally used for sterilization.

Thermoplastic resins such as transparent acrylonitrile-butadiene-styrene copolymer (ABS) resins have good mechanical and thermal properties to be used in a wide range of applications. In addition, the thermoplastic resins have good properties in terms of transparency, hygienic properties, stiffness and heat resistance and thus can be used as a material for medical supplies such as medical devices, surgical instruments, or surgical appliances.

However, such a thermoplastic resin can suffer from yellowing and deterioration in physical properties due to generation of radicals in the resin when irradiated with ionizing radiation. To overcome these problems, there has been proposed a method of stabilizing a thermoplastic resin by adding various additives, such as an antioxidant including a silicone compound or a sulfone compound, a heat stabilizer, and a UV stabilizer, to the thermoplastic resin. However, the additives cannot completely solve the problems such as yellowing.

Therefore, there is a need for development of an ABS-based thermoplastic resin composition with good properties in terms of discoloration resistance, transparency, and color even after irradiation with ionizing radiation and thus can be used as a material for ionizing radiation resistant medical supplies.

The background technique of the present invention is disclosed in U.S. Pat. No. 6,166,116 and the like.

DISCLOSURE

Technical Problem

It is an object of the present invention to provide an ionizing radiation resistant thermoplastic resin composition, which has good properties in terms of discoloration resistance, transparency and color even after even after irradiation with ionizing radiation, and a molded product formed thereof.

The above and other objects of the present invention can be achieved by the present invention described below.

Technical Solution

One aspect of the present invention relates to a thermoplastic resin composition. The thermoplastic resin composition includes: a rubber-modified vinyl graft copolymer; a first aromatic vinyl copolymer; a second aromatic vinyl copolymer; and polyalkylene glycol, wherein the first aromatic vinyl copolymer is a copolymer of methyl methacrylate, methyl acrylate, an aromatic vinyl monomer and a monomer copolymerizable with the aromatic vinyl monomer; the second aromatic vinyl copolymer is a copolymer of an aromatic vinyl monomer and a monomer copolymerizable with the aromatic vinyl monomer; and the first aromatic vinyl copolymer comprises methyl methacrylate and methyl acrylate in a weight ratio of about 1:0.01 to about 1:0.2.

In some embodiments, the thermoplastic resin composition may include about 100 parts by weight of a base resin comprising about 10% by weight (wt %) to about 50 wt % of the rubber-modified vinyl graft copolymer, about 30 wt % to about 70 wt % of the first aromatic vinyl copolymer, and about 5 wt % to about 40 wt % of the second aromatic vinyl copolymer; and about 0.001 to about 5 parts by weight of the polyalkylene glycol.

In some embodiments, the rubber-modified vinyl graft copolymer may be prepared through graft polymerization of the aromatic vinyl monomer and the monomer copolymerizable with the aromatic vinyl monomer to a rubber polymer.

In some embodiments, the first aromatic vinyl copolymer may be a copolymer of about 65 wt % to about 85 wt % of methyl methacrylate and methyl acrylate, about 10 wt % to about 30 wt % of the aromatic vinyl monomer, and about 1 wt % to about 10 wt % of the monomer copolymerizable with the aromatic vinyl monomer.

In some embodiments, the second aromatic vinyl copolymer may be a copolymer of about 5 wt % to about 50 wt % of the aromatic vinyl monomer and about 50 wt % to about 95 wt % of the monomer copolymerizable with the aromatic vinyl monomer.

In some embodiments, the thermoplastic resin composition may have a difference in yellow index ($\Delta YI$) of about 4 or less, as calculated on a 3.2 mm thick specimen according to Equation 1:

$$\Delta YI = YI_1 - YI_0 \quad \text{[Equation 1]}$$

wherein $YI_0$ is a yellow index (YI) of the specimen, as measured in accordance with ASTM D1925 before irradiation with gamma rays, and $YI_1$ is a yellow index (YI) of the specimen, as measured in accordance with ASTM D1925 after the specimen is irradiated with 25 kGy gamma rays and left for 21 days.

In some embodiments, the thermoplastic resin composition may have a luminosity (L*) of about 85 or more, an a* value of about −3 to about 4, and a b* value of about −3 to about 4, as measured on a 3.2 mm thick specimen in accordance with ASTM D2244 after the specimen is irradiated with 25 kGy gamma rays and left for 21 days.

In some embodiments, the thermoplastic resin composition may have a transmittance of about 85% or more, as measured on a 3.2 mm thick specimen in accordance with ASTM D1003 after the specimen is irradiated with 25 kGy gamma rays and left for 21 days, and a haze of about 5% or less, as measured on a 3.2 mm thick specimen in accordance with ASTM D1003.

Another aspect of the present invention relates to a molded product formed of the thermoplastic resin composition as set forth above.

In some embodiments, the molded product may be an ionizing radiation resistant medical supply.

Advantageous Effects

The present invention provides an ionizing radiation resistant thermoplastic resin composition, which has good properties in terms of discoloration resistance, transparency and color even after even after irradiation with ionizing radiation, and a molded product produced therefrom. The molded product is advantageously used as an ionizing radiation resistant medical supply.

BEST MODE

Hereinafter, embodiments of the present invention will be described in detail.

A thermoplastic resin composition according to the present invention has ionizing radiation resistance and includes: (A) a rubber-modified vinyl graft copolymer; (B) a first aromatic vinyl copolymer; (C) a second aromatic vinyl copolymer; and (D) polyalkylene glycol.

(A) Rubber-Modified Vinyl Graft Copolymer

In some embodiments, the rubber-modified vinyl graft copolymer may be a rubber-modified vinyl graft copolymer used for a typical thermoplastic resin composition. For example, the rubber-modified vinyl graft copolymer may be prepared by graft polymerization of a monomer mixture including an aromatic vinyl monomer and a monomer copolymerizable with the aromatic vinyl monomer to a rubber polymer. Specifically, the rubber-modified vinyl graft copolymer may be obtained by adding the monomer mixture including the aromatic vinyl monomer and the monomer copolymerizable with the aromatic vinyl monomer to the rubber polymer, followed by polymerization (graft copolymerization). Here, polymerization may be performed by any typical polymerization method known in the art, such as emulsion polymerization, suspension polymerization, bulk polymerization, and the like.

In some embodiments, the rubber polymer may include, for example, diene rubbers such as polybutadiene, poly (styrene-butadiene), and poly(acrylonitrile-butadiene); saturated rubbers obtained by adding hydrogen to the diene rubbers, isoprene rubbers, acrylic rubbers such as poly(butyl acrylate), and ethylene-propylene-diene monomer terpolymer (EPDM), without being limited thereto. For example, the rubber polymer may be a diene rubber, specifically a polybutadiene rubber. The rubber polymer (rubber particles) may have an average particle diameter (D50) of about 0.05 μm to about 6 μm, for example, about 0.15 μm to about 4 μm, specifically about 0.25 μm to about 3.5 μm. Within this range, the thermoplastic resin composition can have good properties in terms of impact resistance and appearance. The rubber polymer may be present in an amount of about 5 wt % to about 65 wt %, for example, about 10 wt % to about 60 wt %, based on 100 wt % of the rubber-modified vinyl graft copolymer, and the monomer mixture (including the aromatic vinyl monomer and the monomer copolymerizable with the aromatic vinyl monomer) may be present in an amount of about 35 wt % to about 95 wt %, for example, about 40 wt % to about 90 wt %, based on 100 wt % of the rubber-modified vinyl graft copolymer. Within this range, the thermoplastic resin composition can have good impact resistance and stiffness.

In some embodiments, the aromatic vinyl monomer is graft-copolymerizable with the rubber copolymer and may include, for example, styrene, α-methylstyrene, β-methyl styrene, p-methyl styrene, p-t-butylstyrene, ethyl styrene, vinylxylene, monochlorostyrene, dichlorostyrene, dibromo-styrene, and vinyl naphthalene, and combinations thereof, without being limited thereto. For example, styrene may be used as the aromatic vinyl monomer.

In some embodiments, the monomer copolymerizable with the aromatic vinyl monomer may include, for example, alkyl (meth)acrylate, such as methyl methacrylate, methyl acrylate, and the like; vinyl cyanide monomers, such as acrylonitrile, methacrylonitrile, ethacrylonitrile, and the like; and monomers for imparting processability and thermal resistance, such as acrylic acid, methacrylic acid, maleic anhydride, N-substituted maleimide, and the like, without being limited thereto. These may be used alone or as a mixture thereof.

In some embodiments, the rubber-modified vinyl graft copolymer may include, for example, methyl methacrylate-acrylonitrile-butadiene-styrene graft copolymer (g-MABS), acrylonitrile-butadiene-styrene graft copolymer (g-ABS), and acrylonitrile-styrene-acrylate graft copolymer(g-ASA), without being limited thereto.

In some embodiments, the rubber-modified vinyl graft copolymer may be present in an amount of about 10 wt % to about 50 wt %, for example, about 15 wt % to about 40 wt %, specifically about 20 wt % to about 30 wt %, based on 100 wt % of the thermoplastic resin composition. Within this range, the thermoplastic resin composition can exhibit good properties in terms of impact resistance, stiffness, discoloration resistance, transparency, color, and property balance therebetween.

(B) First Aromatic Vinyl Copolymer

According to embodiments of the invention, the first aromatic vinyl copolymer serves to maintain transparency and color of the thermoplastic resin composition while improving discoloration resistance even after irradiation with ionizing radiation. The first aromatic vinyl copolymer is a copolymer of methyl methacrylate, methyl acrylate, an aromatic vinyl monomer and a monomer copolymerizable with the aromatic vinyl monomer, in which the methyl methacrylate and the methyl acrylate may be present in a weight ratio of about 1:0.01 to about 1:0.2, for example, about 1:0.03 to about 1:0.18. If the weight ratio of the methyl methacrylate to the methyl acrylate is less than about 1:0.01, the thermoplastic resin composition can suffer deterioration in discoloration resistance, and if the weight ratio of the methyl methacrylate to the methyl acrylate exceeds about 1:0.2, the thermoplastic resin composition can suffer deterioration in thermal resistance.

In some embodiments, the first aromatic vinyl copolymer may be prepared by mixing the methyl methacrylate, the methyl acrylate, the aromatic vinyl monomer and the monomer copolymerizable with the aromatic vinyl monomer, followed by polymerization. Here, polymerization may be performed by any typical polymerization method known in the art, such as emulsion polymerization, suspension polymerization, bulk polymerization, and the like.

In some embodiments, the methyl methacrylate and the methyl acrylate may be present in an amount of about 65 wt % to about 85 wt %, for example, about 70 wt % to about 80 wt %, based on 100 wt % of the first aromatic vinyl copolymer. Within this range, the thermoplastic resin composition can exhibit good properties in terms of discoloration resistance, transparency, color, and the like even after irradiation with ionizing radiation.

In some embodiments, the aromatic vinyl monomer may include, for example, styrene, α-methylstyrene, β-methyl styrene, p-methylstyrene, p-t-butylstyrene, ethyl styrene, vinylxylene, monochlorostyrene, dichlorostyrene, dibromostyrene, and vinyl naphthalene, and combinations thereof, without being limited thereto. For example, styrene may be used as the aromatic vinyl monomer. The aromatic vinyl monomer may be present in an amount of about 10 wt % to about 30 wt %, for example, about 15 wt % to about 25 wt %, based on 100 wt % of the first aromatic vinyl copolymer. Within this range, the thermoplastic resin composition can exhibit good properties in terms of discoloration resistance, transparency, color, and the like even after irradiation with ionizing radiation.

In some embodiments, the monomer copolymerizable with the aromatic vinyl monomer may include, for example, vinyl cyanide monomers, such as acrylonitrile, methacrylonitrile, ethacrylonitrile, and the like; and monomers for imparting processability and thermal resistance, such as acrylic acid, methacrylic acid, maleic anhydride, N-substituted maleimide, and the like, without being limited thereto. These may be used alone or as a mixture thereof. The monomer copolymerizable with the aromatic vinyl monomer may be present in an amount of about 1 wt % to about 10 wt %, for example, about 2 wt % to about 9 wt %, based on 100 wt % of the first aromatic vinyl copolymer. Within this range, the thermoplastic resin composition can exhibit good properties in terms of discoloration resistance, transparency, color, and the like even after irradiation with ionizing radiation.

In some embodiments, the first aromatic vinyl copolymer may have a weight average molecular weight (Mw) of about 10,000 g/mol to about 300,000 g/mol, for example, about 15,000 g/mol to about 200,000 g/mol, as measured by gel permeation chromatography (GPC). Within this range, the thermoplastic resin composition can have good properties in terms of impact resistance, stiffness, moldability, and the like.

In some embodiments, the first aromatic vinyl copolymer may be present in an amount of about 30 wt % to about 70 wt %, for example, about 35 wt % to about 65 wt %, specifically about 40 wt % to about 60 wt %, based on the total weight of the thermoplastic resin. Within this range, the thermoplastic resin composition can have good properties in terms of impact resistance, stiffness, discoloration resistance, transparency, color, and property balance therebetween.

(C) Second Aromatic Vinyl Copolymer

According to embodiments of the invention, the second aromatic vinyl copolymer may be an aromatic vinyl copolymer used for a typical thermoplastic resin composition. For example, the second aromatic vinyl copolymer may be an aromatic vinyl copolymer of a monomer mixture including an aromatic vinyl monomer and a monomer copolymerizable with the aromatic vinyl monomer.

In some embodiments, the second aromatic vinyl copolymer may be prepared by mixing the aromatic vinyl monomer with the monomer copolymerizable with the aromatic vinyl monomer, followed by polymerization. Here, polymerization may be performed by any typical polymerization method in the art, such as emulsion polymerization, suspension polymerization, bulk polymerization, and the like.

In some embodiments, the aromatic vinyl monomer may include, for example, styrene, α-methylstyrene, β-methyl styrene, p-methylstyrene, p-t-butylstyrene, ethyl styrene, vinylxylene, monochlorostyrene, dichlorostyrene, dibromostyrene, vinyl naphthalene, and combinations thereof, without being limited thereto. For example, styrene may be used as the aromatic vinyl monomer. The aromatic vinyl monomer may be present in an amount of about 5 wt % to about 50 wt %, for example, about 10 wt % to about 40 wt %, based on 100 wt % of the second aromatic vinyl copolymer. Within this range, the thermoplastic resin composition can exhibit good properties in terms of impact resistance, stiffness, moldability, and the like.

In some embodiments, the monomer copolymerizable with the aromatic vinyl monomer may include, for example, alkyl (meth)acrylate, such as methyl methacrylate, methyl acrylate, and the like; vinyl cyanide monomers, such as acrylonitrile, methacrylonitrile, ethacrylonitrile, and the like; and monomers for imparting processability and thermal resistance, such as acrylic acid, methacrylic acid, maleic anhydride, N-substituted maleimide, and the like, without being limited thereto. These may be used alone or as a mixture thereof. The monomer copolymerizable with the aromatic vinyl monomer may be present in an amount of about 50 wt % to about 95 wt %, for example, about 60 wt % to about 90 wt %, based on 100 wt % of the second aromatic vinyl copolymer. Within this range, the thermoplastic resin composition can exhibit good properties in terms of impact resistance, stiffness, moldability, and the like.

In some embodiments, the second aromatic vinyl copolymer may have a weight average molecular weight (Mw) of about 10,000 g/mol to about 300,000 g/mol, for example, about 15,000 g/mol to about 200,000 g/mol, as measured by gel permeation chromatography (GPC). Within this range, the thermoplastic resin composition can have good properties in terms of impact resistance, stiffness, moldability, and the like.

In some embodiments, the second aromatic vinyl copolymer may be present in an amount of about 5 wt % to about 40 wt %, for example, about 10 wt % to about 35 wt %, specifically about 15 wt % to about 30 wt %, based on 100 wt % of the thermoplastic resin. Within this range, the thermoplastic resin composition can have good properties in terms of impact resistance, stiffness, discoloration resistance, transparency, color, and property balance therebetween.

(D) Polyalkylene Glycol

According to embodiments of the invention, the polyalkylene glycol may include polyalkylene glycol, ethers of polyalkylene glycol, and/or esters of polyalkylene glycol. The polyalkylene glycol may include any typical polyols used in ionizing radiation resistant resin compositions, for example, polyethylene glycol, polyethylene glycol methyl ether, polyethylene glycol dimethyl ether, polyethylene glycol dodecyl ether, polyethylene glycol benzyl ether, polyethylene glycol dibenzyl ether, polyethylene glycol-4-nonylphenyl ether, polypropylene glycol, polypropylene glycol methyl ether, polypropylene glycol dimethyl ether, polypropylene glycol dodecyl ether, polypropylene glycol benzyl ether, polypropylene glycol dibenzyl ether, polypropylene glycol-4-nonylphenyl ether, polytetramethylene glycol, polyethylene glycol diacetate ester, polyethylene glycol acetate propionate ester, polyethylene glycol dibutyrate ester, polyethylene glycol distearate ester, polyethylene glycol dibenzoate ester, polyethylene glycol di-2 ester, 6-dimethyl benzoate ester, polyethylene glycol di-p-tert-butyl benzoate ester, polyethylene glycol dicaprylate ester, polypropylene glycol diacetate ester, polypropylene glycol acetate propionate ester, polypropylene glycol dibutyrate ester, polypropylene glycol distearate ester, polypropylene glycol dibenzoate ester, polypropylene glycol di-2 ester, 6-dimethyl benzoate ester, polypropylene glycol di-p-tert-butyl benzoate ester, and polypropylene glycol dicaprylate ester. These may be used alone or as a mixture thereof.

In some embodiments, the polyalkylene glycol may have a number average molecular weight (Mn) of about 1,000 g/mol to about 5,000 g/mol, for example about 1,500 g/mol to about 3,000 g/mol, as measured by gel permeation chromatography (GPC).

In some embodiments, the polyalkylene glycol may be present in an amount of about 0.001 to about 5 parts by weight, for example, about 0.01 to about 4 parts by weight, relative to 100 parts by weight of a base resin ((A)+(B)+(C)) including the rubber-modified vinyl graft copolymer (A), the first aromatic vinyl copolymer (B) and the second aromatic vinyl copolymer (C). Within this range, the thermoplastic resin composition can have good discoloration resistance after irradiation with ionizing radiation.

In some embodiments, the thermoplastic resin composition may further include other thermoplastic resins in addition to the base resin so long as addition of the other thermoplastic resins does not deteriorate the advantageous effects of the present invention. For example, the other thermoplastic resins may include polycarbonate, polyethylene terephthalate, polybutylene terephthalate, and polyamide, without being limited thereto. When such other resins are used, the other thermoplastic resins may be present in an amount of about 50 parts by weight or less, for example, about 1 to about 15 parts by weight, relative to 100 parts by weight of the base resin, without being limited thereto.

The thermoplastic resin composition may further include any typical additives used in resin compositions. Examples of the additives may include fillers, reinforcing agents, stabilizers, colorants, antioxidants, antistatic agents, flow enhancers, release agents, nucleating agents, and combinations thereof, without being limited thereto. The additives may be present in an amount of about 25 parts by weight or less, for example, about 10 parts by weight or less, relative to about 100 parts by weight of the base resin, without being limited thereto.

In some embodiments, the thermoplastic resin composition may be prepared by any known method for preparing a thermoplastic resin composition. For example, the polycarbonate resin composition may be prepared in pellet form by mixing the above components and optionally other additives by a typical method, followed by melt extrusion using a twin screw extruder or the like. The prepared pellets may be formed into various molded products through various molding methods, such as injection molding, extrusion molding, vacuum molding, cast molding, and the like.

In some embodiments, the thermoplastic resin composition may have a difference in yellow index (ΔYI) of about 4 or less, for example, about 1 to about 3.5, as measured on a 3.2 mm thick specimen according to Equation 1.

$$\Delta YI = YI_1 - YI_0 \quad \text{[Equation 1]}$$

wherein $YI_0$ is a yellow index (YI) of the specimen, as measured in accordance with ASTM D1925 before irradiation with gamma rays, and $YI_1$ is a yellow index (YI) of the specimen, as measured in accordance with ASTM D1925 after the specimen is irradiated with 25 kGy gamma rays and left for 21 days.

In some embodiments, the thermoplastic resin composition may have a luminosity (L*) of about 85 or more, an a* value of about −3 to about 4, and a b* value of about −3 to about 4, as measured on a 3.2 mm thick specimen in accordance with ASTM D2244 after the specimen is irradiated with 25 kGy gamma rays and left for 21 days.

In some embodiments, the thermoplastic resin composition may have a transmittance of about 85% or more, for example, about 85% to about 95%, as measured on a 3.2 mm thick specimen in accordance with ASTM D1003 after the specimen is irradiated with 25 kGy gamma rays and left for 21 days, and a haze of about 5% or less, for example, about 2% to about 4%, as measured on a 3.2 mm thick specimen in accordance with ASTM D1003.

According to the present invention, a molded product may be manufactured (formed) from the ionizing radiation resistant thermoplastic resin composition as set forth above by any known molding method. The molded product has good properties in terms of discoloration resistance, color, transparency, and impact resistance even after irradiation with ionizing radiation and thus may be used in ionizing radiation resistant medical supplies including: container-type packaging means for receiving or packaging syringes, surgical instruments, intravenous injectors, and surgical appliances; components of medical apparatuses, such as artificial lungs, artificial kidneys, anesthesia inhalers, intravenous connectors, hemodialyzers, hemofilters, safety syringes, and accessories therefor; and components of blood centrifuges, surgical instruments, surgical appliances, and intravenous injectors.

Mode for Invention

Next, the present invention will be described in more detail with reference to some examples. It should be understood that these examples are provided for illustration only and are not to be in any way construed as limiting the present invention.

Description of details apparent to those skilled in the art will be omitted for clarity.

EXAMPLE

Details of components used in Examples and Comparative Examples are as follows.

(A) Rubber-Modified Vinyl Graft Copolymer

A methyl methacrylate-acrylonitrile-butadiene-styrene graft copolymer (g-MABS) obtained through graft copolymerization of 55 wt % of polybutadiene rubber particles (average particle diameter (D50): 280 nm) and 45 wt % of methyl methacrylate, styrene and acrylonitrile (weight ratio: 72/21/7) was used.

(B) First Aromatic Vinyl Copolymer (B1) A methyl methacrylate-styrene-acrylonitrile copolymer (MSAN, weight average molecular weight: 90,000 g/mol) obtained through polymerization of 74 wt % of methyl methacrylate (MMA) and methyl acrylate (Mac) (weight ratio (MMA:Mac) of 1:0.06), 22 wt % of styrene and 4 wt % of acrylonitrile was used.

(B2) A methyl methacrylate-styrene-acrylonitrile copolymer (MSAN, weight average molecular weight: 90,000 g/mol) obtained through polymerization of 74 wt % of methyl methacrylate (MMA) and methyl acrylate (Mac) (weight ratio (MMA:Mac) of 1:0.14), 22 wt % of styrene and 4 wt % of acrylonitrile was used.

(B3) A methyl methacrylate-styrene-acrylonitrile copolymer (MSAN, weight average molecular weight: 90,000 g/mol) obtained through polymerization of 74 wt % of methyl methacrylate, 22 wt % of styrene and 4 wt % of acrylonitrile was used.

(C) Second Aromatic Vinyl Copolymer

A methyl methacrylate-styrene-acrylonitrile copolymer (MSAN, weight average molecular weight: 120,000 g/mol) obtained through polymerization of 74 wt % of methyl methacrylate, 21 wt % of styrene and 5 wt % of acrylonitrile was used.

(D) Polyalkylene Glycol

Polypropylene glycol (number average molecular weight (Mn): 2,000 g/mol) was used.

Examples 1 and 2 and Comparative Examples 1 and 2: Preparation of Thermoplastic Resin Composition According to compositions and amounts as listed in Table 1, (A) a rubber-modified vinyl graft copolymer, (B) a first aromatic vinyl copolymer, (C) a second aromatic vinyl copolymer and (D) polyalkylene glycol were mixed, followed by extrusion molding using a twin-screw type extruder (L/D=36, Φ=32) at 250° C. and preparation of a thermoplastic resin composition in pellet form using a pelletizer. The thermoplastic resin composition prepared in pellet form was dried in an oven at 80° C. for 2 hours, followed by injection molding using an injection molding machine (DHC 120WD, Dongshin Hydraulics Co., Ltd.) under conditions of a molding temperature of 250° C. and a mold temperature of 70° C., thereby preparing a specimen. The prepared specimen was evaluated as to the following properties and evaluation results are shown in Table 1.

Property Evaluation (1) Discoloration resistance: A difference in yellow index (ΔYI) was calculated by the following Equation 1 by measuring yellow indices of a 3.2 mm thick specimen of a thermoplastic resin composition in accordance with ASTM D1925 before irradiation with gamma rays and after the specimen was irradiated with 25 kGy gamma rays and left for 21 days, respectively.

$$\Delta YI = YI_1 - YI_0 \qquad \text{[Equation 1]}$$

wherein $YI_0$ is a yellow index (YI) of the specimen, as measured in accordance with ASTM D1925 before irradiation with gamma rays, and $YI_1$ is a yellow index (YI) of the specimen, as measured in accordance with ASTM D1925 after the specimen is irradiated with 25 kGy gamma rays and left for 21 days.

(2) Color evaluation: Luminosity (L*), a* and b* were measured on a 3.2 mm thick specimen of a thermoplastic resin composition in accordance with ASTM D2244 before irradiation with gamma rays and after the specimen was irradiated with 25 kGy gamma rays and left for 21 days.

(3) Transparency (unit: %): Transmittance (total light transmittance) and haze were measured on a 3.2 mm thick specimen of a thermoplastic resin composition in accordance with ASTM D1003 before irradiation with gamma rays and after the specimen was irradiated with 25 kGy gamma rays and left for 21 days.

TABLE 1

|  |  | Example |  | Comparative Example |  |
|---|---|---|---|---|---|
|  |  | 1 | 2 | 1 | 2 |
| (A) (wt %) |  | 25 | 25 | 25 | 25 |
| (B) (wt %) | (B1) | 55 | — | — | 55 |
|  | (B2) | — | 55 | — | — |
|  | (B3) | — | — | 55 | — |
| (C) (wt %) |  | 20 | 20 | 20 | 20 |
| (D) (parts by weight) |  | 0.1 | 0.1 | 0.1 | — |
| Before irradiation with γ-ray | Transmittance (%) | 91.2 | 91.2 | 91.3 | 91.3 |
|  | Haze (%) | 2.5 | 2.1 | 2.8 | 2.7 |
|  | YI | 2.1 | 1.8 | 3.5 | 2.6 |
|  | L* | 96.0 | 95.9 | 96.1 | 96.1 |
|  | a* | −0.5 | −0.5 | −0.6 | −0.6 |
|  | b* | 1.4 | 1.2 | 2.1 | 1.5 |
| 21 days after irradiation with γ-ray | Transmittance (%) | 90.5 | 90.8 | 90.1 | 89.6 |
|  | Haze (%) | 3.4 | 2.8 | 4.2 | 5.8 |
|  | YI | 5.2 | 4.3 | 7.8 | 8.0 |
|  | L* | 96.4 | 95.8 | 96.8 | 97.1 |
|  | a* | −0.1 | −0.9 | −0.1 | −0.3 |
|  | b* | 3.2 | 2.6 | 4.6 | 5.0 |
| ΔYI (before irradiation with gamma ray/21 days after irradiation with gamma ray) |  | 3.1 | 2.5 | 4.3 | 5.4 |

From the results shown in Table 1, it could be seen that the thermoplastic resin compositions (Examples 1 and 2) according to the present invention had good properties in terms of discoloration resistance, color, and transparency even after irradiation with ionizing radiation.

On the contrary, it could be seen that the thermoplastic resin composition of Comparative Example 1 prepared using the first aromatic vinyl copolymer (B3) not containing methyl acrylate (Mac) and the thermoplastic resin composition of Comparative Example 2 prepared without polyalkylene glycol suffered from deterioration in discoloration resistance, color, and transparency after irradiation with ionizing radiation.

It should be understood that various modifications, changes, alterations, and equivalent embodiments can be made by those skilled in the art without departing from the spirit and scope of the present invention.

The invention claimed is:

1. A thermoplastic resin composition comprising:
about 100 parts by weight of a base resin comprising about 10 wt % to about 50 wt % of a rubber-modified vinyl graft copolymer; about 30 wt % to about 70 wt % of a first aromatic vinyl copolymer; and about 5 wt % to about 40 wt % of a second aromatic vinyl copolymer; and
about 0.001 to about 5 parts by weight of polyalkylene glycol,
wherein the first aromatic vinyl copolymer is a copolymer of methyl methacrylate, methyl acrylate, an aromatic vinyl monomer and a monomer copolymerizable with the aromatic vinyl monomer,
the second aromatic vinyl copolymer is a copolymer of an aromatic vinyl monomer and a monomer copolymerizable with the aromatic vinyl monomer, and
the first aromatic vinyl copolymer comprises methyl methacrylate and methyl acrylate in a weight ratio of about 1:0.01 to about 1:0.2.

2. The thermoplastic resin composition according to claim 1, wherein the rubber-modified vinyl graft copolymer is prepared through graft polymerization of an aromatic vinyl monomer and a monomer copolymerizable with the aromatic vinyl monomer to a rubber polymer.

3. The thermoplastic resin composition according to claim 1, wherein the first aromatic vinyl copolymer is a copolymer of about 65 wt % to about 85 wt % of methyl methacrylate and methyl acrylate, about 10 wt % to about 30 wt % of the aromatic vinyl monomer, and about 1 wt % to about 10 wt % of the monomer copolymerizable with the aromatic vinyl monomer.

4. The thermoplastic resin composition according to claim 1, wherein the second aromatic vinyl copolymer is a copolymer of about 5 wt % to about 50 wt % of the aromatic vinyl monomer and about 50 wt % to about 95 wt % of the monomer copolymerizable with the aromatic vinyl monomer.

5. The thermoplastic resin composition according to claim 1, wherein the thermoplastic resin composition has a difference in yellow index ($\Delta YI$) of about 4 or less, as calculated on a 3.2 mm thick specimen according to Equation 1:

$$\Delta YI = YI_1 - YI_0 \quad [\text{Equation 1}]$$

wherein $YI_0$ is a yellow index (YI) of the specimen, as measured in accordance with ASTM D1925 before irradiation with gamma rays, and $YI_1$ is a yellow index (YI) of the specimen, as measured in accordance with ASTM D1925 after the specimen is irradiated with 25 kGy gamma rays and left for 21 days.

6. The thermoplastic resin composition according to claim 1, wherein the thermoplastic resin composition has a luminosity (L*) of about 85 or more, an a* value of about −3 to about 4, and a b* value of about −3 to about 4, as measured on a 3.2 mm thick specimen in accordance with ASTM D2244 after the specimen is irradiated with 25 kGy gamma rays and left for 21 days.

7. The thermoplastic resin composition according to claim 1, wherein the thermoplastic resin composition has a transmittance of about 85% or more, as measured on a 3.2 mm thick specimen in accordance with ASTM D1003 after the specimen is irradiated with 25 kGy gamma rays and left for 21 days, and a haze of about 5% or less, as measured on a 3.2 mm thick specimen in accordance with ASTM D1003.

8. A molded product formed of the thermoplastic resin composition according to claim 1.

9. The molded product according to claim 8, wherein the molded product is an ionizing radiation resistant medical supply product.

* * * * *